(No Model.) 2 Sheets—Sheet 1.
D. G. WEEMS.
ELECTRIC RAILWAY SYSTEM.
No. 396,633. Patented Jan. 22, 1889.
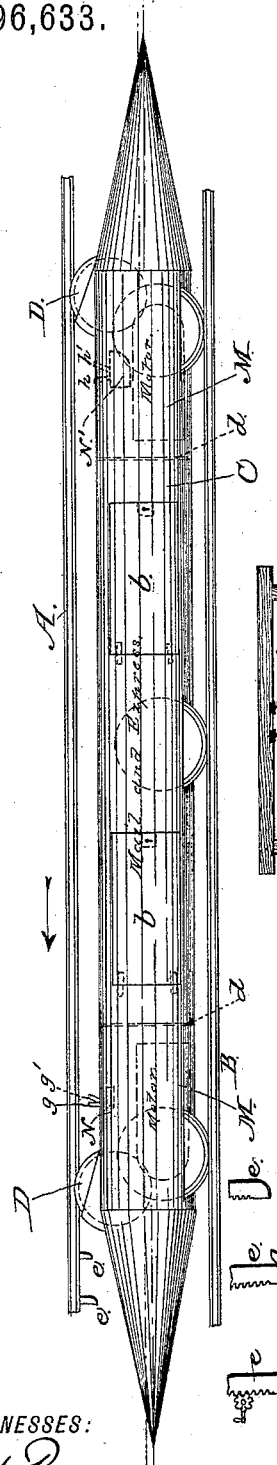
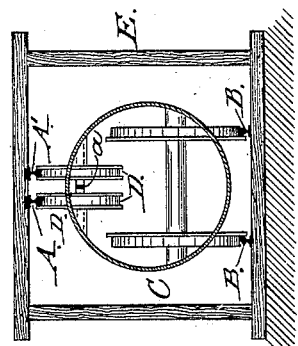
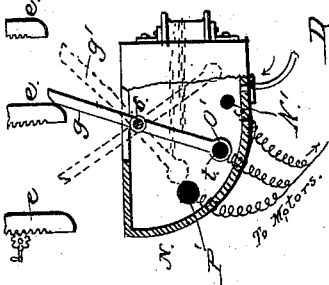
WITNESSES:
INVENTOR,
BY
ATTORNEYS.

(No Model.) 2 Sheets—Sheet 2.

D. G. WEEMS.
ELECTRIC RAILWAY SYSTEM.

No. 396,633. Patented Jan. 22, 1889.

WITNESSES: INVENTOR
Wm. W. Pegram David G. Weems
Benj. J. Dashiell Jr. BY A. H. Evans & Co.
ATTORNEYS.

United States Patent Office.

DAVID G. WEEMS, OF BALTIMORE, MARYLAND, ASSIGNOR TO THE ELECTRO-AUTOMATIC TRANSIT COMPANY OF BALTIMORE, MARYLAND.

ELECTRIC-RAILWAY SYSTEM.

SPECIFICATION forming part of Letters Patent No. 396,633, dated January 22, 1889.

Application filed June 14, 1888. Serial No. 277,062. (No model.)

*To all whom it may concern:*

Be it known that I, DAVID G. WEEMS, a citizen of the United States, residing at Baltimore city, State of Maryland, have invented certain new and useful Improvements in Electric-Railway Systems, of which the following is a full and clear description, reference being had to the accompanying drawings, forming part of this specification, in which—

Figure 4:
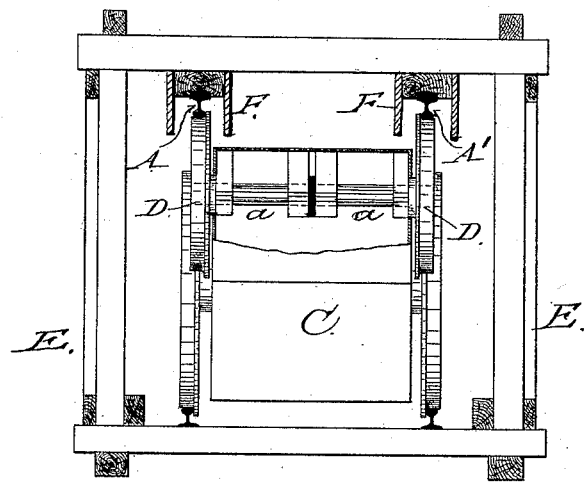
Figure 5:
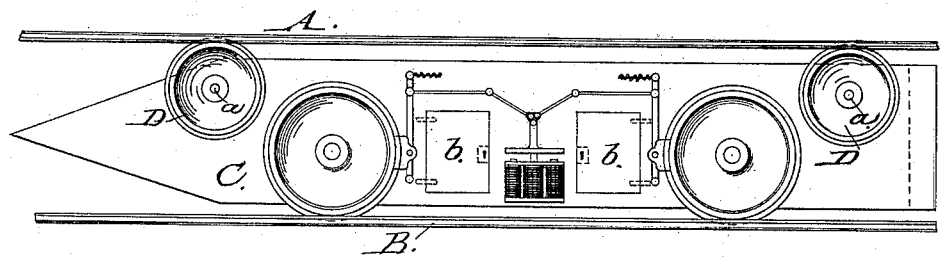
Figure 6:
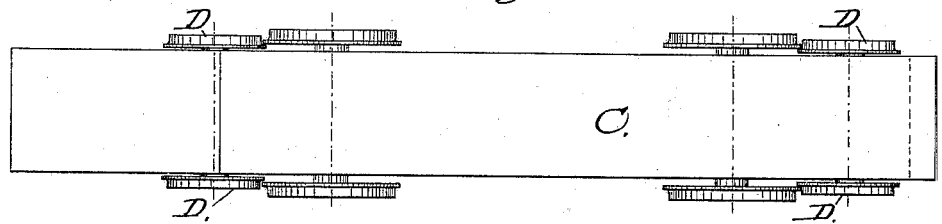

Figure 1 represents a side elevation showing the upper and lower rails, and a car divided into compartments having pointed front and rear ends, said car having means for propelling the car in opposite directions. Fig. 2 is a transverse sectional view of said car, showing a plural number of upper current-conducting rails, the guide-wheels, the lower bearing wheels and rails, and a frame-work or casing in which the rails are mounted. Fig. 3 illustrates a car similar to the one shown in Fig. 1, but adapted to travel in one direction only. Fig. 4 is an end view showing the upper guide-rails located near the outer sides of the car. Fig. 5 is a side elevation of the front portion of the car, showing the doors by which access may be had to the interior of the car, and showing also brake mechanism for checking the speed of the train. Fig. 6 is a plan view with the brake mechanism removed. Fig. 7 is a detail illustrating one of the housings and a means for adjusting the same vertically. Fig. 8 is a detail illustrating one of the housings with its levers and contact-points, and also showing the adjustable stops.

My present invention relates to certain additional improvements in electric-railway systems for transporting mail and express packages, &c., at a high rate of speed over a line of elevated, surface, or underground tracks or rails, using as a motive power electricity, and having the motor or motors located at one or both ends of the train, the said train being supplied with means for controlling, starting, and stopping itself.

The object of my invention is to improve the systems described and claimed in my former patent, No. 376,567, granted to me January 17, 1888, and the application, Serial No. 276,124, filed by me June 5, 1888, on which systems the present invention is an improvement; and my invention consists in the constructions and combinations of devices which I shall hereinafter fully describe and claim.

To enable others skilled in the art to make and use my invention, I will now describe the same and indicate the manner in which I carry the same out.

In the said drawings, A A′ represent upper electrically-charged guide-rails; B B, the lower bearing-rails; C, the car, and D D the guide-wheels for conveying the current from the upper rails to the motor.

In my former constructions I employed but a single upper rail and single guide-wheels and conveyed the electric current from said rail through the forward guide-wheel to the motor on the front car or locomotive, and thence transmitted the current to the lower rail and back to the stationary dynamo at the end of the line; but in the present case I employ a plural number of guide-rails and a plural number of guide-wheels, whereby I am permitted to use the upper rails as the means for receiving and returning the current, using the lower rails simply as the bearing-rails for the car.

The rails A A′ will be suitably secured in a frame-work or tunnel, E, such as shown in Figs. 2 and 4, one of said rails being adapted to convey the outgoing current, while the other rail returns the current after it has passed through the motor, and said rails may be located contiguous to each other, as shown in Fig. 2, or may be separated from each other, as shown in Fig. 4. In either case they will be preferably placed within a housing, F, and properly insulated therefrom.

The guide-wheels D will be mounted on a shaft, $a$, in the upper portions of the car, and they will be placed at such points on the shaft $a$ as will permit them to snugly fit the tracks, the said shaft or shafts being insulated, as shown in Figs. 2 and 4.

In my former patent the train when made up consisted of a locomotive having a motor and a series of cars connected therewith; but in the present case the carrier consists of the single car C of suitable length, having its front and rear end pointed or wedge-shaped, and having doors $b$ in its sides, whereby access may readily be had to the interior of the car, and said car may be provided with any well-known form of brake mechanism, such as shown in Fig. 5, and illustrated, described, and claimed in an application filed by me June 5, 1888, Serial No. 276,124.

The car C is divided into any desired number of compartments by means of the internally-placed partitions $d$, and in these compartments the motor or motors, mail and express packages, &c., may be placed, each compartment having one or more of the doors $b$ leading to it, as shown in Figs. 1 and 3.

By reason of the double-pointed car and the plural number of upper rails and guide-wheels I may locate a motor at both ends of the car, if desired, and may use in connection therewith the system of levers and adjustable stops which are set forth in my said application of June 5, 1888; but when said levers or stops are employed it will be advisable to secure the housing in which the levers are mounted, so that they may be moved into an inoperative position when desired.

In Fig. 1 I have shown a motor, M, in the compartment at each end of the car, and I have also illustrated the housings N N', with their levers $g\ g'$ and $h\ h'$, which are tripped by the stops $e$ on the road, as previously stated.

Now, it will be observed that when the train is traveling in the direction of the arrow the housing and levers N and $g\ g'$ are in position where they may strike the adjusted stop $e$, and the housing N' and levers $h\ h'$ are moved down, so that they will not be affected by the stops, the adjusting of said housing being accomplished by any well-known means, such as by the pivoted lever 2, (see Fig. 7,) which is connected at one end with the housing and at the other end with a rod, 3, which, when operated, moves the housing into or out of line with the stops $e$. When the end of the line has been reached, the housing N and its levers are lowered, the housing and levers at the opposite end of the car raised, and the current turned on and the train started on its return-trip.

By employing the double-pointed car with a motor in each end I am enabled to dispense with switches, turn-tables, and like devices for preparing the car for the return-trip. The housings N N', like those in my said former application, are connected with the electrically-charged rail by a wire, as shown in Fig. 8, and they are mounted in suitable ways or guides, whereby they may have a free movement when operated by the rod 3. (Shown in Fig. 7.) Between the sides of the housing and mounted upon a pin or bolt, 5, is a lever, $g$, the lower end of which carries a contact-point, $t$, while the upper portion, which is struck by the stops $e$, is beveled, the said lever being also attached to a second lever, $g'$, upon the pin or bolt 6 by means of a chain or connection, as shown in Fig. 14, and as shown, described, and claimed in my said former application. The housings are also provided with insulated contact-points N' O' P', from which wires lead to the main wire which transmits the current to the motors. The stops $e$ in the present case will also be vertically adjustable, and they will be arranged to trip the levers in the manner set forth in my said former application.

Having thus described my invention, what I claim as new, and desire to secure by Letters Patent, is—

In an electric-railway system for transporting mail and packages, the combination, with upper and lower rails and stops on the line of road, of an electrically-operated car, means for conveying the current thereto, and adjustable housings on the car having levers, which are actuated by the stops, substantially as and for the purpose described.

DAVID G. WEEMS.

Witnesses:
WM. M. PEGRAM,
B. J. DASHIEL, Jr.